United States Patent
Kim (10) Patent No.: US 6,933,997 B2
(45) Date of Patent: Aug. 23, 2005

(54) LIQUID CRYSTAL DISPLAY DEVICE AND ARRAY SUBSTRATE FOR THE SAME

(75) Inventor: Do-Sung Kim, Gumi-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 46 days.

(21) Appl. No.: 10/636,619

(22) Filed: Aug. 8, 2003

(65) Prior Publication Data

US 2004/0125302 A1 Jul. 1, 2004

(30) Foreign Application Priority Data

Dec. 31, 2002 (KR) ................................. 10-2002-0088534

(51) Int. Cl.[7] ............................................. G02F 1/1343
(52) U.S. Cl. ........................ 349/139; 349/142; 349/143
(58) Field of Search ................................. 349/142, 139, 349/143, 141

(56) References Cited

U.S. PATENT DOCUMENTS

| | | | |
|---|---|---|---|
| 4,691,995 A | 9/1987 | Yamazaki et al. | |
| 5,309,264 A | 5/1994 | Lien et al. | |
| 5,608,556 A | 3/1997 | Koma | |
| 5,666,179 A | 9/1997 | Koma | |
| 6,100,953 A | 8/2000 | Kim et al. | |
| 6,671,020 B2 * | 12/2003 | Kim et al. | 349/129 |
| 6,771,343 B2 * | 8/2004 | Kim et al. | 349/141 |

FOREIGN PATENT DOCUMENTS

| | | |
|---|---|---|
| EP | 884626 A2 | 12/1998 |
| JP | 06-235925 | 8/1994 |
| JP | 08-101395 | 4/1996 |
| JP | 09-061829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |
| WO | WO 00/08521 | 2/2000 |

* cited by examiner

*Primary Examiner*—Dung T. Nguyen
*Assistant Examiner*—Phu Vu
(74) *Attorney, Agent, or Firm*—McKenna Long & Aldridge LLP (57) ABSTRACT

A liquid crystal display device includes a first substrate and a second substrate, a gate line and a data line on the first substrate, and crossing each other to define a pixel region, a thin film transistor electrically connected to the gate and data lines, a pixel electrode in the pixel region, the pixel electrode electrically connected to the thin film transistor and having a plurality of slits, an auxiliary electrode on the first substrate, and the auxiliary including a first portion corresponding to a circumference of the pixel electrode and a second portion of a zigzag shape in the first portion, a common electrode on the second substrate, and an organic pattern on the common electrode, the organic pattern including a first part corresponding to a circumference of the pixel electrode and a plurality of second parts between adjacent slits, wherein the auxiliary electrode overlaps the plurality of slits and the organic pattern.

20 Claims, 6 Drawing Sheets

FIG. 1

(RELATED ART)

FIG. 2

(RELATED ART)

LIQUID CRYSTAL DISPLAY DEVICE AND ARRAY SUBSTRATE FOR THE SAME

This application claims the benefit of Korean Patent Application No. 2002-88534, filed in Korea on Dec. 31, 2002, which is hereby incorporated by reference for all purposes as if fully set forth herein.

BACKGROUND OF THE INVENTION

1. Field of the Invention

The present invention relates to a liquid crystal display (LCD) device and more particularly, to a liquid crystal display (LCD) device having a wide viewing angle and an array substrate for the same.

2. Discussion of the Related Art

In general, a liquid crystal display (LCD) device utilizes an optical anisotropy and birefringence properties of liquid crystal molecules to display images. The liquid crystal display (LCD) device usually has first and second substrates spaced apart from and opposing each other. The first and second substrates respectively have electrodes for forming an electric field between the electrodes. That is, if voltage is applied to the electrodes of the liquid crystal display (LCD) device, an electric field is formed between the electrodes and the electric field changes alignments of the liquid crystal molecules. The changed alignments of the liquid crystal molecules control a light transmittance through the liquid crystal and thus images can be displayed by controlling the light transmittance through the liquid crystal.

Figure 1:
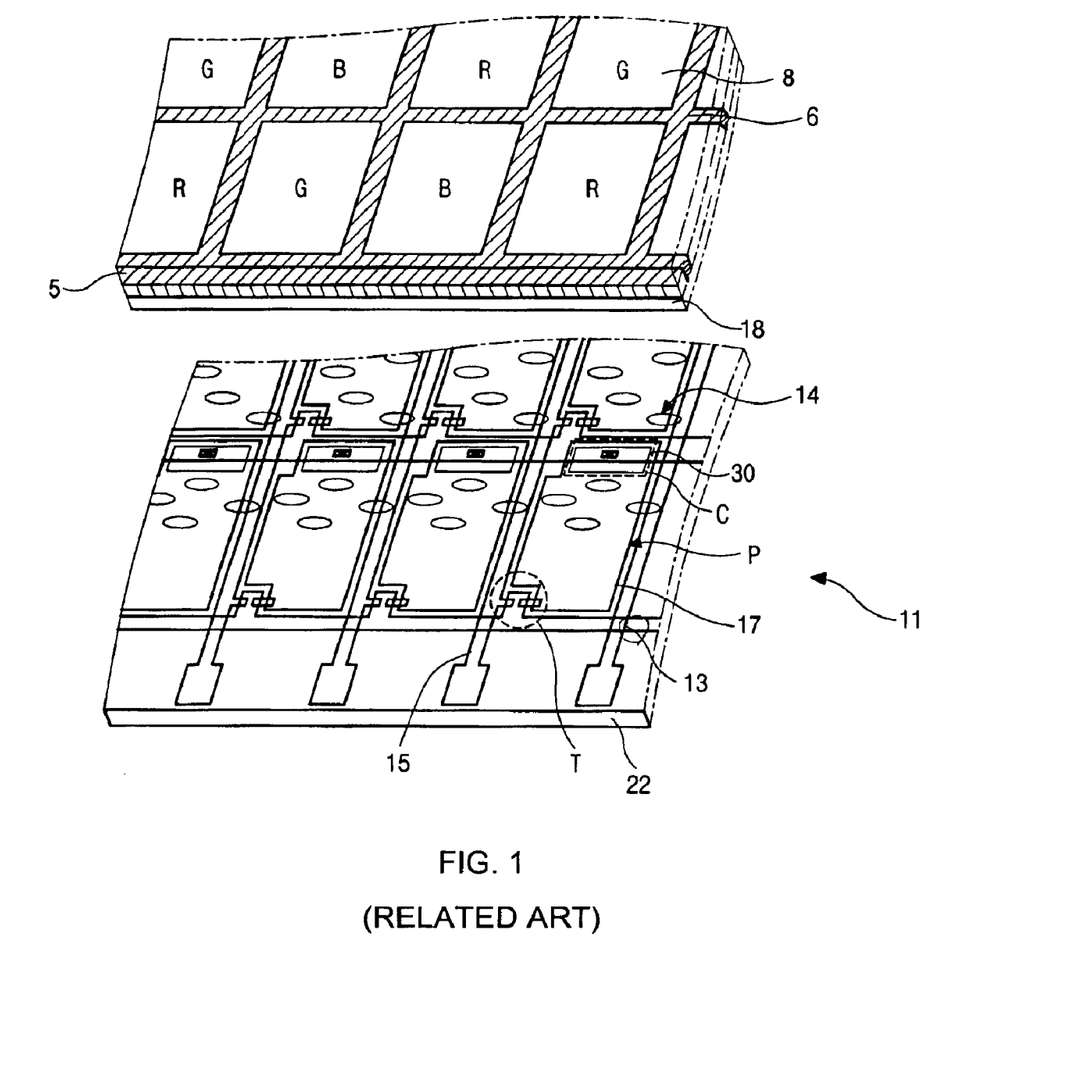
FIG. 1 is an exploded perspective view of a related art liquid crystal display (LCD) device.

FIG. 1 is an exploded perspective view of a related art liquid crystal display (LCD) device. In FIG. 1, a liquid crystal display (LCD) device 11 has an upper substrate 5 having a black matrix 6, a color filter layer 8, and a common electrode 18 on the color filter layer 8, and a lower substrate 22 having a thin film transistor T and a pixel electrode 17 connected to the thin film transistor T. The color filter layer 8 has sub-color filters of red (R), green (G) and blue (B), and the black matrix 6 is formed between the sub-color filters. A plurality of pixel regions P is defined on the lower substrate 22 and array lines are formed around the pixel region P. Liquid crystal 14 is interposed between the upper and lower substrates 5 and 22. A gate line 13 is formed in a first direction and a data line 15 is formed in a second direction perpendicular to the first direction. The gate and data lines 13 and 15 define the pixel region P by crossing each other and the thin film transistor T is formed near crossing portion of the gate and data lines 13 and 15. The thin film transistors "T" are formed in a matrix form on the lower substrate 22, i.e., an array substrate. The pixel electrode 17 is formed of transparent conductive metal material such as indium tin oxide (ITO) in the pixel region "P. A storage capacitor C connected to the pixel electrode 17 in parallel is formed over the gate line 13. A portion of the gate line 13 serves as a first storage electrode and a metal layer formed of the same material as source and drain electrodes serves as a second storage electrode. The metal layer contacts the pixel electrode 17 to receive a signal from the pixel electrode 17. Because liquid crystal molecules are aligned by an electric field formed between the common and pixel electrodes 18 and 17, the liquid crystal display (LCD) device (specially TN (twisted nematic) mode liquid crystal display (LCD) device) has a narrow viewing angle. To overcome the aforementioned problem, a method to improve a viewing angle by dividing the pixel region into many domains, in which the liquid crystal molecules in one of the domains have a symmetric orientation to the orientation of the liquid crystal molecules in a next domain, has been suggested. A structure of the liquid crystal display (LCD) device to improve the viewing angle will be described hereinafter with reference to FIG. 2.

Figure 2:
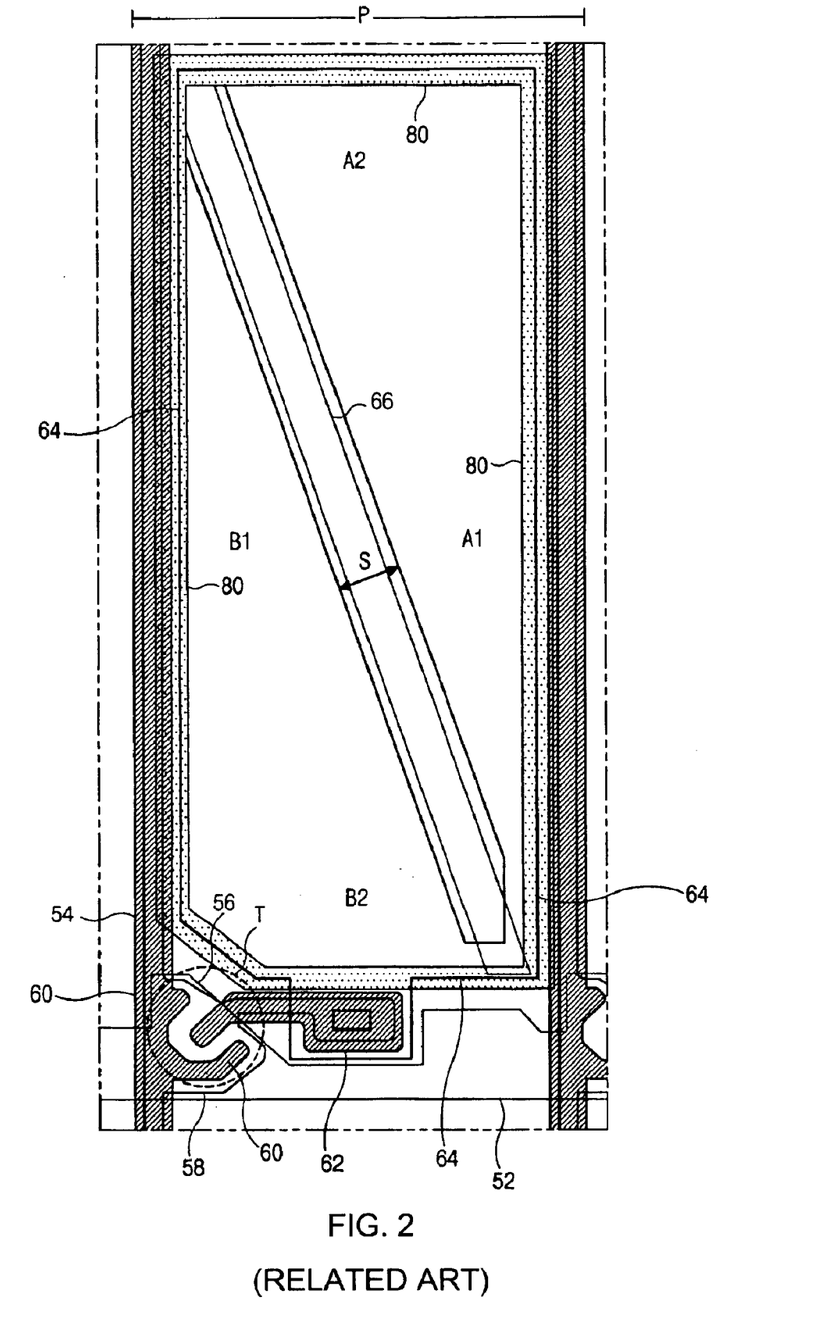
FIG. 2 is a plan view of a related art liquid crystal display (LCD) device having a multi-domain structure.

FIG. 2 is a plan view of a related art liquid crystal display (LCD) device having a multi-domain structure. In FIG. 2, a gate line 52 is formed in a first direction on a substrate 50, which may be a lower substrate of the LCD device, and a data line 54 crossing the gate line 52 is formed in a second direction. The gate line 52 and the data line 54 define a pixel region P. At the crossing the gate line 52 and the data line 54, a thin film transistor T having a gate electrode 56, an active layer 58, a source electrode 60 and a drain electrode 62 is formed. A pixel electrode 64 connected to the drain electrode 62 is formed in the pixel region P, and the pixel electrode 64 includes a slit S, which is formed by removing the pixel electrode 64 along a diagonal of the pixel electrode 64 and divides the pixel region P into two parts. A sub-electrode 66 is formed corresponding to the slit S.

Meanwhile, an organic pattern 80 is formed in a peripheral area of the pixel region P, and the organic pattern 80 is disposed on an upper substrate (not shown), which includes a common electrode (not shown).

Here, the organic pattern 80 and the slit S distort electric field perpendicularly induced between the pixel electrode 64 and the common electrode, and the sub electrode 66 increases distortion of the electric field. At this time, although not shown in the figure, a first alignment layer over the lower substrate 50 and a second alignment layer over the upper substrate are rubbed such that rubbing directions of the alignment layers are at 90 degrees to each other, wherein the rubbing direction of the first alignment layer is at 45 degrees to the data line 54.

Therefore, in the related art LCD device, electric field is induced symmetrically with respect to the slit S, and the liquid crystal molecules are arranged along the symmetric electric field.

The liquid crystal molecules in left and right sides A1 and B1 of the pixel region P are parallel to electric field, and thus are stable. Also, the liquid crystal molecules in upper and lower sides A2 and B2 of the pixel region P are stable, though the liquid crystal molecules are arranged in the opposite direction to the liquid crystal molecules in the left and right sides A1 and B1 of the pixel region P and go away from the electric field.

In the LCD device, two domains, which are separated by the slit S and where the liquid crystal molecules are differently arranged, are formed in the pixel region P, and each domain, also, includes two areas of A1 and A2 or B1 and B2, for example. Accordingly, stability in arrangement of the liquid crystal molecules is lowered. Additionally, light leakage and residual images occur due to the low arranging stability of the liquid crystal molecules, and spots happen when the LCD device is touched by weak force.

SUMMARY OF THE INVENTION

Accordingly, the present invention is directed to a liquid crystal display (LCD) device and an array substrate for the same that substantially obviates one or more of problems due to limitations and disadvantages of the related art.

An advantage of the present invention is to provide a liquid crystal display (LCD) device and an array substrate for the same that have a wide viewing angle.

Another advantage of the present invention is to provide a liquid crystal display (LCD) device and an array substrate for the same that include multi-domains where liquid crystal molecules are symmetrically arranged.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate and a second substrate, a gate line and a data line on the first substrate, and crossing each other to define a pixel region, a thin film transistor electrically connected to the gate and data lines, a pixel electrode in the pixel region, the pixel electrode electrically connected to the thin film transistor and having a plurality of slits, an auxiliary electrode on the first substrate, and the auxiliary electrode including a first portion corresponding to a periphery of the pixel electrode and a second portion of a zigzag shape in the first portion, a common electrode on the second substrate, and an organic pattern on the common electrode, the organic pattern including a first part corresponding to a circumference of the pixel electrode and a plurality of second parts between adjacent slits, wherein the auxiliary electrode overlaps the plurality of slits and the organic pattern.

In another aspect, a liquid crystal display device includes a first substrate and a second substrate, a gate line and a data line on the first substrate, and crossing each other to define a pixel region, a thin film transistor electrically connected to the gate and data lines, a pixel electrode in the pixel region, the pixel electrode electrically connected to the thin film transistor and having a plurality of slits parallel to the gate line, wherein the plurality of slits divides the pixel region into a plurality of areas, an auxiliary electrode on the first substrate, the auxiliary electrode including vertical portions and horizontal portions, the vertical portions corresponding to left and right sides of the pixel electrode, the horizontal portions corresponding to the plurality of slits, a common electrode on the second substrate, and a plurality of organic patterns on the common electrode, each organic pattern diagonally disposed in each area.

In another aspect, an array substrate for a liquid crystal display device includes a substrate, a gate line and a data line on the substrate, and crossing each other to define a pixel region, a thin film transistor electrically connected to the gate and data lines, a pixel electrode in the pixel region, the pixel electrode electrically connected to the thin film transistor and having a plurality of slits, and an auxiliary electrode on the first substrate, and including a first portion corresponding to a periphery of the pixel electrode and a second portion of a zigzag shape in the first portion, the second portion overlapping the plurality of slits.

In another aspect, an array substrate for a liquid crystal display device includes a substrate, a gate line and a data line on the first substrate, and crossing each other to define a pixel region, a thin film transistor electrically connected to the gate and data lines, a pixel electrode in the pixel region, the pixel electrode electrically connected to the thin film transistor and having a plurality of slits parallel to the gate line, wherein the plurality of slits divides the pixel region into a plurality of areas, and an auxiliary electrode on the first substrate, the auxiliary electrode including vertical portions and horizontal portions, the vertical portions corresponding to left and right sides of the pixel electrode, the horizontal portions corresponding to the plurality of slits.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 3:
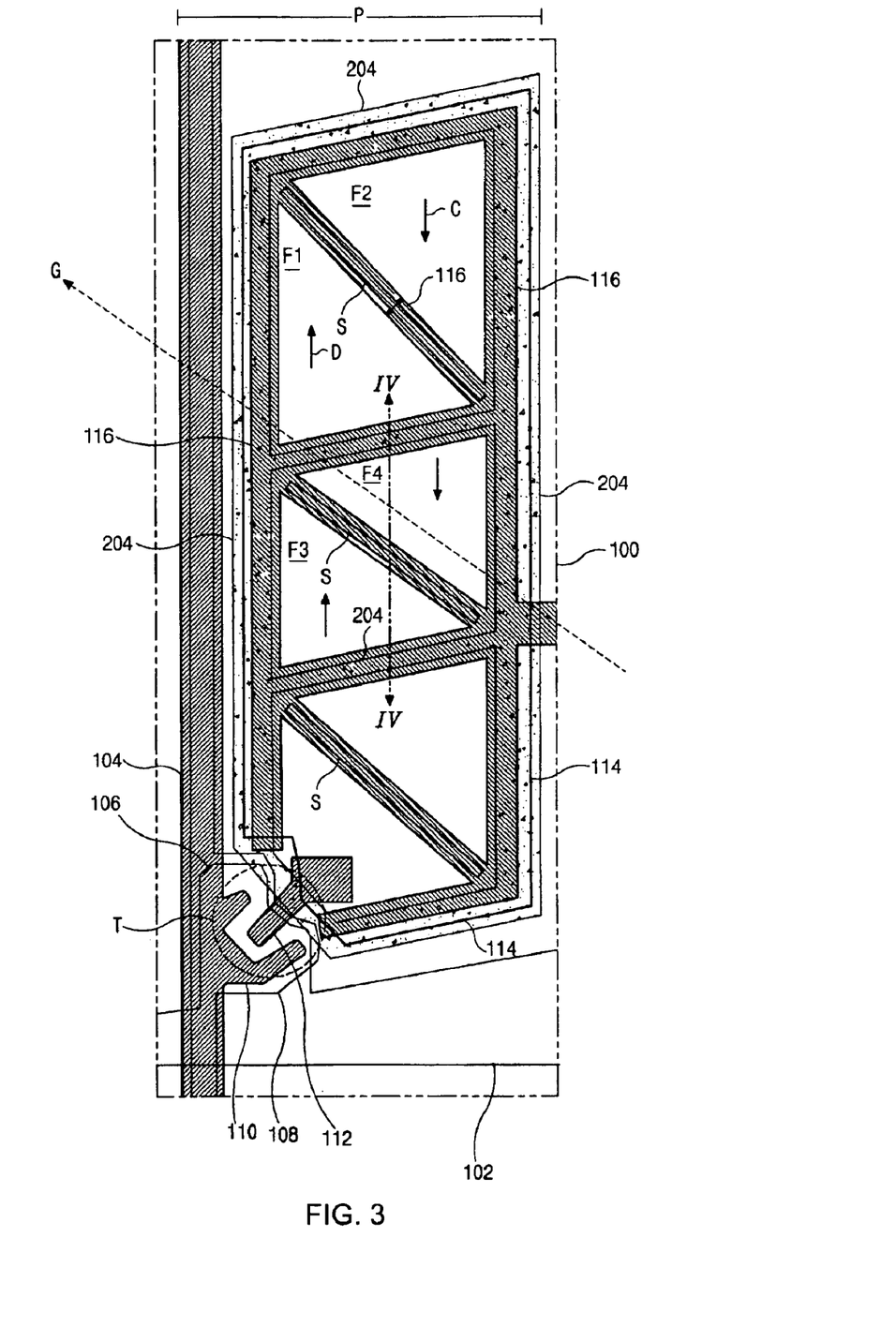
FIG. 3 is a plan view of a liquid crystal display (LCD) device according to a first embodiment of the present invention.
Figure 4:
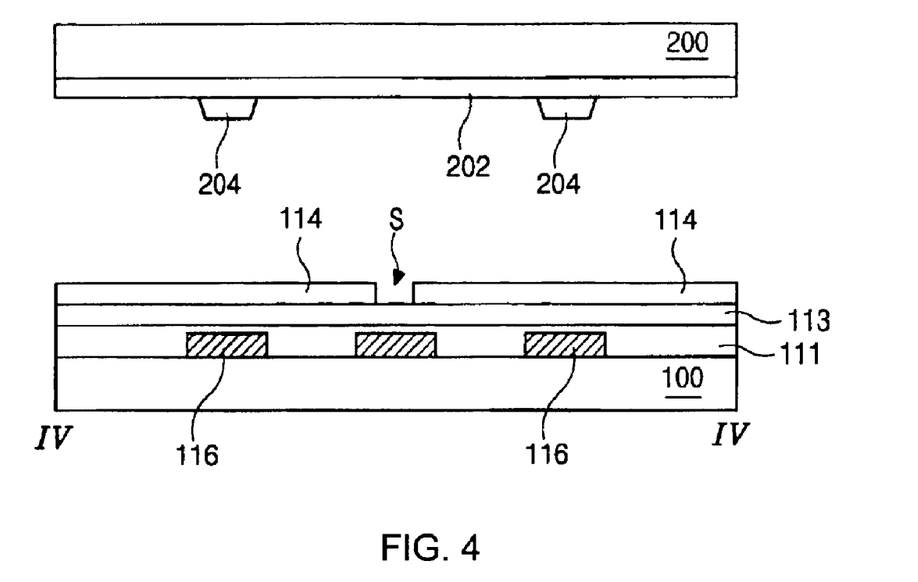
FIG. 4 is a cross-sectional view along the line IV—IV of FIG. 3.

FIG. 3 is a plan view of a liquid crystal display (LCD) device according to a first embodiment of the present invention, and FIG. 4 is a cross-sectional view along the line IV—IV of FIG. 3.

In FIGS. 3 and 4, a gate line 102 is formed in a first direction on a lower substrate 100 and a data line 104 is formed in a second direction substantially perpendicular to the first direction. The gate and data lines 102 and 104 define a pixel region P by crossing each other. A thin film transistor T including a gate electrode 106, a semiconductor 108, a source electrode 110 and a drain electrode 112 is formed at the crossing of the gate line 102 and the data line 104. The semiconductor layer 108 is extended under the data line 104 to improve contact properties with the data line 104. The source electrode 110 and the drain electrode 112 have a U-shape and a rod shape, respectively, and are spaced apart from each other. Thus, the source electrode 110 and the drain electrode 112 form a channel of a U-shape. The U-shape channel increases a channel width and decreases a channel length to improve carrier mobility of the thin film transistor T.

A pixel electrode 114 connected to the drain electrode 112 is formed in the pixel region P. The pixel electrode 114 has a plurality of slits S, which are inclined at about 135 degrees with respect to the gate line 102 formed horizontally in the context of the figure and spaced apart from each other. The slits S are formed by removing portions of the pixel electrode 114.

An organic pattern 204 is formed on an upper substrate 200. The organic pattern 204 corresponds to the periphery of the pixel electrode 114 and also includes parts disposed between the slits S. Thus, the slits S and the organic pattern 204 form a zigzag shape in a plan view. Here, a common electrode 202 is formed between the upper substrate 200 and the common electrode 202.

Meanwhile, in FIG. 4, reference numerals 111 and 113 designate a gate insulating layer and a passivation layer, respectively.

An auxiliary electrode 116 is formed on the lower substrate 110 corresponding to the organic pattern 204 and the slits S. The auxiliary electrode 116 may be made of the same material as the gate line 102 and the gate electrode 106, even though the auxiliary electrode 116 receives different signal from the gate line 102 and the gate electrode 106. The auxiliary electrode 116 may be formed of the same material as the source and drain electrodes 110 and 112. Additionally, the auxiliary electrode 116 and the pixel electrode 114 overlapping each other may function as a storage capacitor.

Accordingly, the pixel region P includes at least three portions, each of which is composed of two domains having symmetric directions C and D of electric field. Here, a rubbing direction G of an alignment layer (not shown) over the lower substrate 100 may be substantially parallel to the slits S, that is, inclined at about 135 degrees with respect to the gate line 102.

In addition, to increase distorting effect of electric field by the slits S, the liquid crystal molecules may be arranged at a right angle with the slits S. At this time, if chiral dopants, which are right handed such that the liquid crystal molecules rotate in an opposite direction, are added, the liquid crystal molecules may be stably arranged.

Driving states of the liquid crystal molecules in the domains F1, F2, F3, F4 will be described hereinafter.

In a first domain F1, the liquid crystal molecules rotate from about 135 degrees to about 90 degrees with respect to the gate line 102 by the distorted electric field between the pixel electrode 114 and the common electrode 202. In a second domain F2, the liquid crystal molecules rotate from about 315 degrees to about 270 degrees with respect to the gate line 102. Meanwhile, the liquid crystal molecules in a third domain F3 rotate from about 90 degrees to about 45 degrees, and the liquid crystal molecules in a fourth domain F4 rotate from about 270 degrees to about 225 degrees with respect to the gate line 102.

Thus, average directions of the liquid crystal molecules are symmetric in the upper and lower sides and in the left and right sides. The liquid crystal molecules rotate without obstructions, and a 2-domain TN (twisted nematic) mode, where arrangement of the liquid crystal molecules is very stable, can be achieved.

Figure 5:
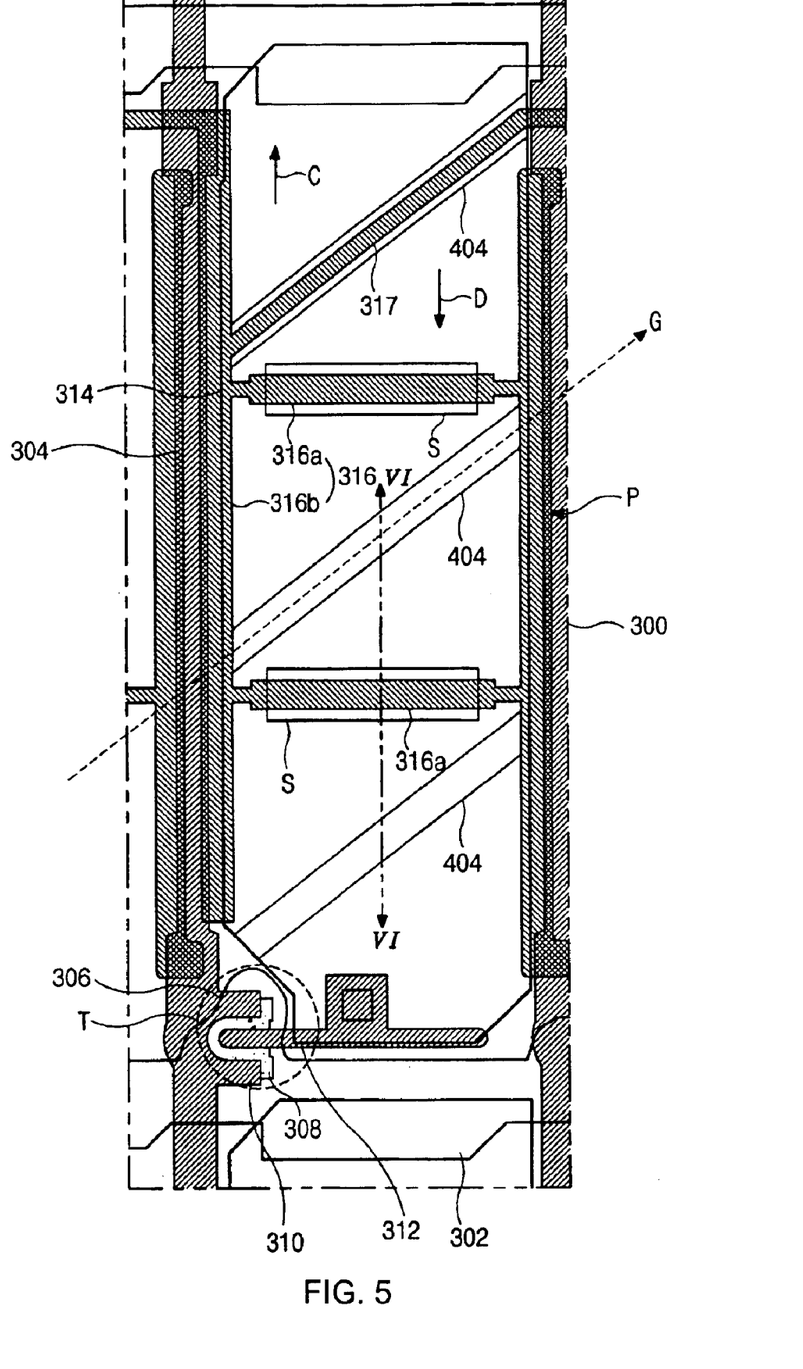
FIG. 5 is a plan view of a liquid crystal display (LCD) device according to a second embodiment of the present invention.
Figure 6:
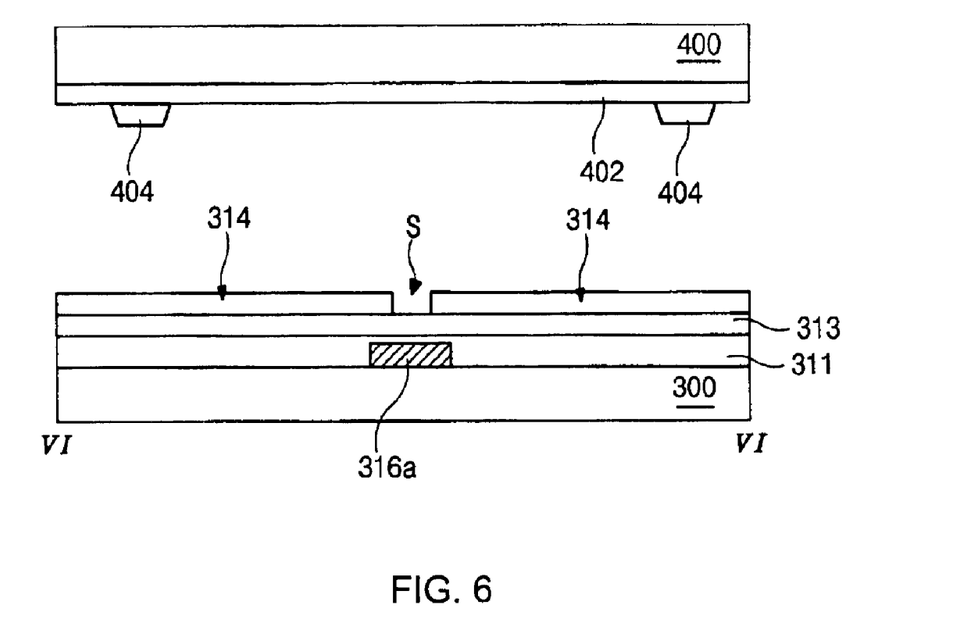
FIG. 6 is a cross-sectional view along the line VI—VI of FIG. 5.

FIG. 5 is a plan view of a liquid crystal display (LCD) device according to a second embodiment of the present invention, and FIG. 6 is a cross-sectional view along the line VI—VI of FIG. 5.

In FIGS. 5 and 6, a gate line 302 is formed in a first direction on a lower substrate 300 and a data line 304 is formed in a second direction substantially perpendicular to the first direction. The gate and data lines 302 and 304 define a pixel region P by crossing each other. A thin film transistor T having a gate electrode 304, a semiconductor layer 308, a source electrode 310 and a drain electrode 312 is formed at the crossing of the gate and data lines 302 and 304. The source electrode 310 and the drain electrode 312 may have a U-shape and a rod shape, respectively, and are spaced apart from each other. Thus, the source electrode 310 and the drain electrode 312 form a channel of a U-shape. The U-shape channel increases a channel width and decreases a channel length to improve carrier mobility of the thin film transistor T.

A pixel electrode 314 connected to the drain electrode 312 is formed in the pixel region P. The pixel electrode 314 has a plurality of slits S, which are parallel with the gate line 302 and spaced apart from each other. The slits S are formed by removing portions of the pixel electrode 114.

Organic patterns 404 are formed on an upper substrate 400. The organic patterns 404 are disposed between the slits S, and in more detail, in several areas of the pixel region P divided by the slits S, and are inclined at an angle within a range of about 30 degrees to about 45 degrees with respect to the gate line 302. A common electrode 402 is formed between the upper substrate 400 and the organic patterns 404.

In FIG. 6, symbols 311 and 313 designate a gate insulating layer and a passivation layer, respectively.

An auxiliary electrode 316 is formed on the lower substrate 310. The auxiliary electrode 316 consists of horizontal parts 316a corresponding to the slits S and vertical parts 316b corresponding to left and right sides of the pixel electrode 314. The auxiliary electrode 316 may be made of the same material as the gate line 302 and the gate electrode 306, even though the auxiliary electrode 316 receives different signal from the gate line 302 and the gate electrode 306. The auxiliary electrode 316 may be formed of the same material as the source and drain electrodes 310 and 312. The auxiliary electrode 316 and the pixel electrode 314 overlapping each other may function as a storage capacitor. The vertical parts 316b of the auxiliary electrode 316, also, overlap both sides of the data line 304.

Meanwhile, a connection electrode 317 may be formed to connect the auxiliary electrodes 316 of the adjacent pixel regions P. The connection electrode 317 corresponds to one of the organic patterns 404.

Accordingly, the pixel region P includes three portions, each of which is composed of two domains having symmetric directions C and D of electric field. Here, a rubbing direction G of an alignment layer (not shown) over the lower substrate 300 is substantially parallel to the direction of the organic patterns 404, that is, inclined at an angle within a range of about 30 degrees to about 45 degrees with respect to the gate line 302. An alignment layer (not shown) over the upper substrate 400 is rubbed substantially perpendicularly to the rubbing direction G of the alignment over the lower substrate 300.

In addition, to increase distorting effect of electric field by the slits S, the liquid crystal molecules may be arranged at a right angle with the slits S. At this time, if chiral dopants, which are right handed such that the liquid crystal molecules rotate in an opposite direction, are added, the liquid crystal molecules may be stably arranged.

In the LCD device, average directions of the liquid crystal molecules are symmetric in the upper and lower sides and in the left and right sides. The liquid crystal molecules rotate without obstructions, and a 2-domain TN (twisted nematic) mode, where arrangement of the liquid crystal molecules is very stable, can be achieved.

Additionally, the LCD device has a wide viewing angle due to the 2 domains.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate and a second substrate;
   a gate line and a data line on the first substrate, and crossing each other to define a pixel region;
   a thin film transistor electrically connected to the gate and data lines;
   a pixel electrode in the pixel region, the pixel electrode electrically connected to the thin film transistor and having a plurality of slits;
   an auxiliary electrode on the first substrate, the auxiliary electrode including a first portion corresponding to a periphery of the pixel electrode and a second portion of a zigzag shape in the first portion;
   a common electrode on the second substrate; and
   an organic pattern on the common electrode, the organic pattern including a first part corresponding to a periphery of the pixel electrode and a plurality of second parts between adjacent slits,
   wherein the auxiliary electrode overlaps the plurality of slits and the organic pattern.

2. The device according to claim 1, wherein the plurality of slits is inclined at about 135 degrees with respect to the gate line.

3. The device according to claim 1, wherein the auxiliary electrode is formed of the same material as the gate line.

4. The device according to claim 1, wherein the auxiliary electrode is formed of the same material as the data line.

5. The device according to claim 1, further comprising an aligmnent layer on the first substrate, the alignment layer rubbed substantially parallel to the plurality of slits.

6. A liquid crystal display device, comprising:
   first substrate and a second substrate;
   a gate line and a data line on the first substrate, and crossing each other to define a pixel region;
   a thin film transistor electrically connected to the gate and data lines;
   a pixel electrode in the pixel region, the pixel electrode electrically connected to the thin film transistor and having a plurality of slits parallel to the gate line, wherein the plurality of slits divides the pixel region into a plurality of areas;
   an auxiliary electrode on the first substrate, the auxiliary electrode including vertical portions and horizontal portions, the vertical portions corresponding to left and right sides of the pixel electrode and overlapping the data line, the horizontal portions corresponding to the plurality of slits;
   a common electrode on the second substrate; and
   a plurality of organic patterns on the common electrode, each organic pattern diagonally disposed in a respective one of the plurality of areas.

7. The device according to claim 6, wherein the plurality of organic patterns is inclined at an angle within a range of about 30 degrees to about 45 degrees with respect to the gate line.

8. The device according to claim 6, further comprising a connection electrode connecting the auxiliary electrodes in the adjacent pixel regions.

9. The device according to claim 6, wherein the auxiliary electrode is formed of the same material as the gate line.

10. The device according to claim 6, wherein the auxiliary electrode is formed of the same material as the data line.

11. An array substrate for a liquid crystal display device, comprising:
    a substrate;
    a gate line and a data line on the substrate, and crossing each other to define a pixel region;
    a thin film transistor electrically connected to the gate and data lines;
    a pixel electrode in the pixel region, the pixel electrode electrically connected to the thin film transistor and having a plurality of slits; and
    an auxiliary electrode on the first substrate, and including a first portion corresponding to a periphery of the pixel electrode and a second portion of a zigzag shape in the first portion, the second portion overlapping the plurality of slits.

12. The array substrate according to claim 11, wherein the plurality of slits is inclined at about 135 degrees with respect to the gate line.

13. The array substrate according to claim 11, wherein the auxiliary electrode is formed of the same material as the gate line.

14. The array substrate according to claim 11, wherein the auxiliary electrode is formed of the same material as the data line.

15. The array substrate according to claim 11, wherein the thin film transistor has a channel of a U-shape.

16. An array substrate for a liquid crystal display device, comprising:
    a substrate;
    a gate line and a data line on the first substrate, and crossing each other to define a pixel region;
    a thin film transistor electrically connected to the gate and data lines;
    a pixel electrode in the pixel region, the pixel electrode electrically connected to the thin film transistor and having a plurality of slits parallel to the gate line, wherein the plurality of slits divides the pixel region into a plurality of areas; and
    an auxiliary electrode on the first substrate, the auxiliary electrode including vertical portions and horizontal portions, the vertical portions corresponding to left and right sides of the pixel electrode and overlapping the data line, the horizontal portions corresponding to the plurality of slits.

17. The array substrate according to claim 16, further comprising a connection electrode connecting the auxiliary electrodes in the adjacent pixel regions.

18. The array substrate according to claim 16, wherein the auxiliary electrode includes the same material as the gate line.

19. The array substrate according to claim 16, wherein the auxiliary electrode includes the same material as the data line.

20. The array substrate according to claim 16, wherein the thin film transistor has a channel of a U-shape.

* * * * *